Sept. 17, 1929.  J. NAMET ET AL  1,728,302
SIGNAL
Filed Aug. 26, 1925  2 Sheets-Sheet 1
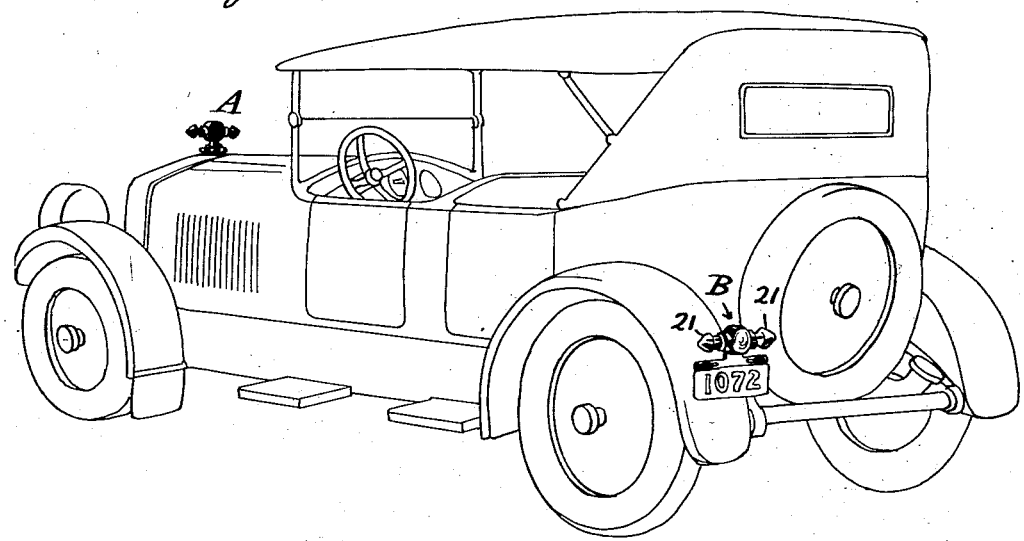
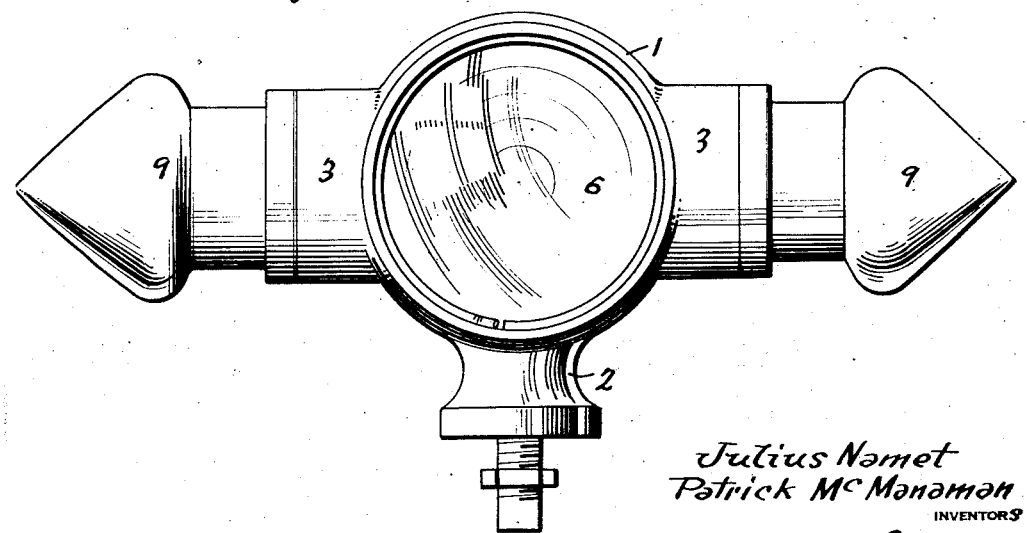
Julius Namet
Patrick McManaman
INVENTORS
BY Victor J. Evans
ATTORNEY
WITNESS: Gerald Hennesy Sept. 17, 1929. J. NAMET ET AL 1,728,302
SIGNAL
Filed Aug. 26, 1925    2 Sheets-Sheet 2
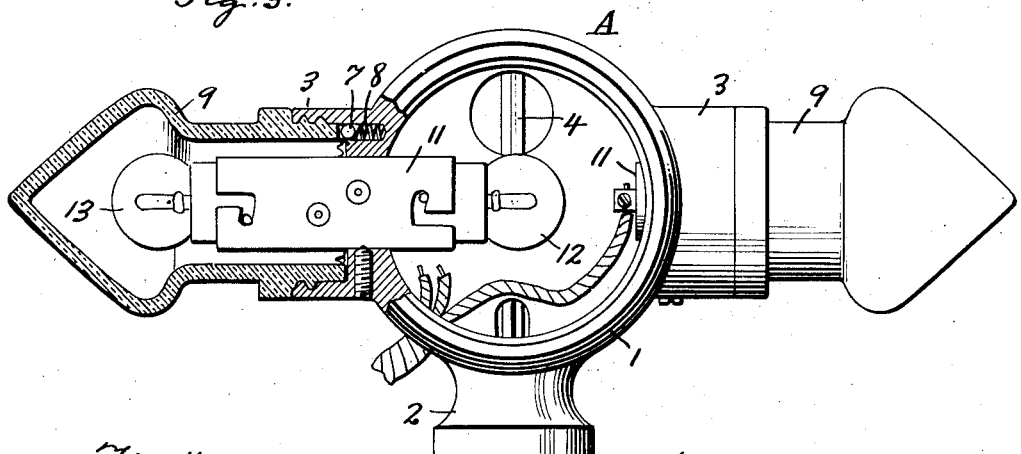
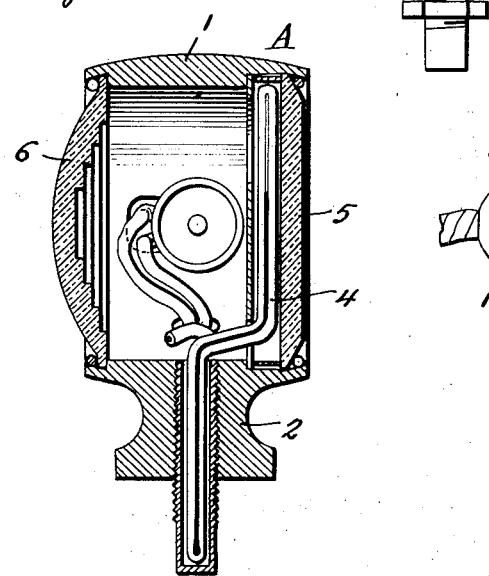
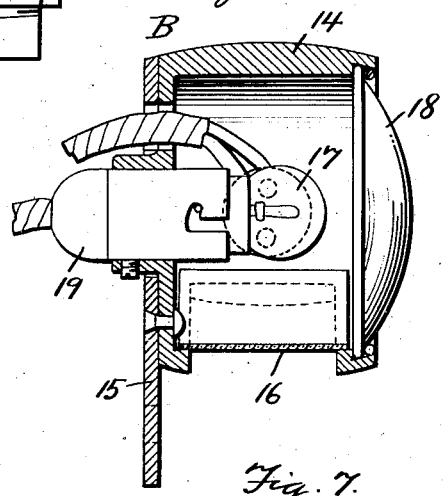
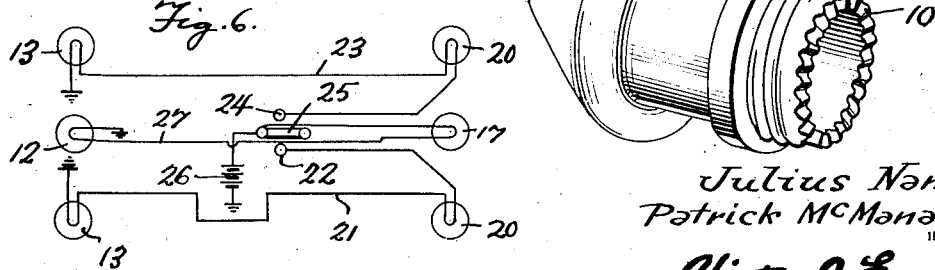
Julius Namet
Patrick McManaman
INVENTORS
BY *Victor J. Evans*
ATTORNEY
WITNESS: *Gerald Hennesy*

Patented Sept. 17, 1929

1,728,302

UNITED STATES PATENT OFFICE

JULIUS NAMET AND PATRICK McMANAMAN, OF CLEVELAND, OHIO

SIGNAL

Application filed August 26, 1925. Serial No. 52,650.

This invention relates to a signal for a motor vehicle and the like, the general object of the invention being to provide a pair of directional signals at each end of the vehicle, with a tail light associated with the rear pair and a lamp for illuminating the thermometer associated with the front pair, with the circuits so arranged that the front lamps will act as tell-tales for the rear ones.

Another object of the invention is to make the tail lamp and the thermometer lamp facilitate the reading of the signals of the other lamps by placing the first mentioned lamps in the center of the devices so that a signal light will appear to either the right or left of the center light and thus enable one to readily see that the signal is either for left or right, according to which side of the center light the signal light appears.

Another object of the invention is to make each globe for the signal lamps of the shape of a spear or arrow with a threaded extremity so that it can be screwed into its supporting member and preferably of red color.

Another object of the invention is to provide simple means for preventing the globe from unscrewing in its support due to the vibrations of the vehicle.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a view of a vehicle showing the invention in use.

Figure 2 is an elevation of the front device.

Figure 3 is a similar view but showing parts in section and the lens removed.

Figure 4 is a central vertical sectional view through this device.

Figure 5 is a similar view through the rear device.

Figure 6 is a diagrammatic view of the circuits.

Figure 7 is a perspective view of one of the globes.

The front device A is adapted to be attached to the radiator cap of the vehicle, while the rear device B is adapted to be attached to the rear part of the vehicle as it contains the tail lamp and means for supporting the license plate.

The front device comprises a cylindrical body 1 which is formed with the base 2 and a tubular extension 3 at each side thereof. The body carries the thermometer 4 and the usual lens 5 and at the front end a lens 6 is arranged which is preferably of green color. The extensions 3 are internally threaded and a spring pressed ball 7 is placed in a socket 8 formed in a wall of the extension. A globe 9, preferably formed of glass, and of spear or arrow shape, and preferably of red color, has its extremity threaded to engage the threads of each of the extensions. This globe forms a directional signal as it points in the direction the vehicle is to turn. The edge of the screw threaded part of each globe is corrugated, as at 10, the corrugations forming recesses to receive the ball 7 which locks the globe in place and prevents vibrations of the vehicle from loosening it.

Sockets 11 are so arranged in the device as to support a lamp 12 in the cylindrical body for illuminating the thermometer and a lamp 13 in each of the globes 9 for illuminating these globes.

The device B also comprises a cylindrical body 14 which has side extensions for receiving signal globes similar to the globes before described and a license supporting plate 15 is attached to the body. The body is provided with a window 16 in its lower part for permitting some of the rays of light from the lamp 17 to illuminate the license plate, while the other rays pass through a red lens 18 in the front of the body so that this part of the device will act as a tail lamp. The lamp 17 is carried by the socket 19 and lamps 20 are located in the globes 21 of this rear device.

The left signal lamp 13 is connected by the conductors 21 with the left hand signal lamp 20 and with a switch terminal 22, while conductors 23 connect the right hand signal lamps 13 and 20 together and to a switch terminal 24. The switch arm 25 is connected to a battery 26. Thus by moving the switch arm, either the right hand lamps or the left hand lamps can be lighted. The center lamps of both devices are connected together by the conductors 27 and to the battery, a suitable switch being arranged in the circuit of these lamps to control the same.

Thus it will be seen that a signal is given both at the front and rear of the vehicle and that by having the lamps in series, the front lamps will act as tell-tales for the rear lamps. The center lamps of the devices will act to position the signal lights at night so that there will be no mistaking the signal or it will appear on either the left or right of the center lamp.

By making the globes of the shape shown, they act as pointers and they can easily be replaced when broken. The device can be manufactured to sell at low cost and it is not likely to get out of order and can be readily repaired if it does.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

A signal device comprising a middle metal body provided with a depending tubular stem, a thermometer tube received by said stem, the body being hollow above the stem and provided with a glass face and also having threaded tubular extensions at opposite sides, globes screwed into said extensions, and lamp sockets mounted in the extensions and projecting into said globes, one of said sockets being double-ended, to receive a lamp in the hollow of the body.

In testimony whereof we affix our signatures.

JULIUS NAMET.
PATRICK McMANAMAN.